United States Patent Office 3,006,880
Patented Oct. 31, 1961

3,006,880
THREE-PHASE AQUEOUS EMULSION COMPRISING CONTINUOUS AQUEOUS PHASE CONTAINING NON-IONIC EMULSIFIER AND TWO OILY DISCONTINUOUS PHASES
Lucius Schibler, Riehen, and Hans Gassmann, Basel, Switzerland, assignors to Ciba Limited, Basel, Switzerland
No Drawing. Filed Mar. 28, 1955, Ser. No. 497,418
Claims priority, application Switzerland Apr. 5, 1954
20 Claims. (Cl. 260—29.4)

Oil-in-water emulsions of water-insoluble hardenable carbamide resins are known and are used for a wide variety of purposes, for example, as adhesives and binding and impregnating agents in the working up of fibrous materials, especially for dressing textiles. As water-insoluble hardenable carbamide resins there are used the condensation products obtained from formaldehyde, a substance containing an amide group and capable of forming a hardenable resin with formaldehyde and an alcohol not substantially miscible with water. Generally there are used for producing the emulsions a solution of such a condensation product in the alcohol used for the condensation. It is known that there is considerable difficulty in producing emulsions which are capable of fulfilling the increasingly high requirements of practice with regard to stability and also fastness of the effects produced with these emulsions.

The high degree of fastness of effects produced with non-emulsified carbamide resins and the good stability of such resins under suitable conditions is known. Attempts to maintain these good properties in the case of emulsified carbamide resins are difficult due to the fact that these properties are impaired by the multifying agent present in the emulsion, when the quantity of the emulsifying agent used is sufficient to ensure stability of the emulsion. This is due to the fact that the presence of the water-soluble emulsifying agent in the hardened carbamide resin promotes loosening or even destruction of the resin structure upon contact with aqueous solutions of washing agents, such as soap, sodium carbonate etc., at least when contact with such solutions is accompanied by mechanical treatment and/or is carried out at a high temperature. By decreasing the proportion of the emulsifying agent used the fastness properties can be improved, but this usually has an unfavorable effect on the stability of the emulsion. Apart from temperature variations and mechanical stresses due to intense stirring, pressing or the like, such emulsions must also tolerate the addition of certain quantities of electrolytes, such as alkalies, acids, or salts, for example, hardening agents or etching agents and the like and/or admixture with other dispersed systems such, for example, as rubber dispersions, polymer latices of all kinds or pigment suspensions. As pigment suspensions there may for instance be used aqueous suspensions of inorganic or organic pigments which contain an anion-active, cation-active or ion-free emulsifying agent. Defective stability is always made evident by a decrease in the degree of dispersion of the disperse phase and is externally visible by separation of the emulsion, coagulation or flocculation. It leads in all cases to considerable reduction in the value of the preparations, and in some cases renders them entirely useless. The above-mentioned difficulty of converting the aforesaid carbamide resin solutions into stable emulsions is probably due to the fact that the alcohols serving as solvents for the resin are generally soluble in water to such an extent that the emulsified droplets assume a hydrophilic character, and some of the alcohol, be it only a small quanity, passes into the aqueous phase. The capacity of the solution for being emulsified is smaller the greater the quantity of alcohol contained in the resin, that is to say, the more dilute the solution. It is therefore of advantage to work with a highly concentrated resin solution. However, as the content of solvent is decreased the viscosity of the resin increases so that it becomes difficult and finally quite impossible to form an emulsion. In order to render more easily emulsifiable carbamide resins dissolved in higher alcohols it has been proposed to use them in conjunction with alkyd resins. However, alkyd resins harden less rapidly and less easily, so that for this reason such combinations of the oil-in-water type cannot compete with pure carbamide resin emulsions.

For the above reasons the production of stable emulsions necessitates the use of very active emulsifying agents. Protective colloids such as glue, gelatine and especially caseinates, if desired, in conjunction with hydrotropic carbamides such as urea, are very well suited for this purpose. However, with such emulsions adhesives impregnating or binding effects of good fastness can be produced only under relatively severe conditions of hardening, as the hardening of the resin is retarded by the presence of these protein materials and by the alkalies which may be necessary to dissolve them, or because the favorable fastness properties of the hardened carbamide resins are impaired by the presence of the said substance.

It has also been proposed to add an aromatic solvent, such as xylene, to the carbamide resin solution to be emulsified, which contains a higher alcohol partially soluble in water. Aromatic solvents are usually miscible to an unlimited extent with the carbamide resin solutions, and the addition of such solvents has the effect of retaining the higher alcohol, that is to say, they shift the partition equilibrium in such manner that a smaller proportion of the higher alcohol passes into the aqueous phase, whereby the formation of an emulsion is facilitated, so that it is possible with suitable emulsifying agents to produce stable aqueous emulsions. However, emulsions which contain such aromatic solvents have been decisively rejected by users, especially in textile printing, owing to the toxic effects produced by these solvents.

The present invention is based on the observation that it is possible to produce stable oil-in-water emulsions of carbamide resins dissolved in an alcohol of limited miscibility with water, which do not have the above-mentioned disadvantages. In accordance with the present invention there are used ion-free emulsifying agents, that is to say, substances which hardly at all or do not impair the hardening capacity of the carbamide resins used. Advantageously, so small a proportion of the emulsifying agent is used that the fastness properties of the effects produced by the emulsion are substantially not reduced. With such a small proportion of emulsifying agent it is usually not possible to obtain a sufficiently stable emulsion without taking special measures. It is surprising that the stability of the emulsions is ensured by incorporating therein, in accordance with the invention, a water-insoluble organic liquid which consists predominantly of an aliphatic hydrocarbon and which is at most of limited miscibility with the carbamide resin to be emulsified, but which is a good solvent for the alcohol of limited miscibility with water used as solvent for the carbamide resin to be emulsified. As a rule this organic solvent incorporated in the emulsion forms a separate inner oily phase, so that a 3-phase emulsion is obtained. It is indeed known to prepare 3-phase emulsions by emulsifying a water-insoluble organic liquid in an emulsion of a carbamide resin solution which emulsion is already stable in se, the aqueous phase of which contains as an emulsifying agent a protein substance, for example, a caseinate. The emulsifying of organic liquids in such stable emulsions has the purpose of thickening the emulsion without increasing the content of dry matter. As a rule, there are necessitated large quantities of organic liquids surpassing considerably the quantity of the emulsified resin. It is, however, unexpected that the incorporation of an organic liquid of the kind mentioned above by using a small quantity thereof only which does not bring about a perceptible thickening of the emulsion yet but which suffices to secure the formation of a third phase in accordance with this invention should result in stabilizing an emulsion system in itself unstable in the absence of such a liquid. The stabilization action of the organic liquid is probably due to the fact that it takes up a considerable proportion of the higher alcohol that passes into the aqueous phase, or that it prevents to a considerable extent the transfer of the alcohol from the carbamide resin phase into the aqueous phase. The stabilization produced in this manner in many cases considerably exceeds that which is produced by the addition to the carbamide resin solution to be emulsified of an aromatic solvent, such as xylene.

Accordingly, this invention provides a process for the manufacture of a stable 3-phase aqueous emulsion of a hardenable water-insoluble carbamide resin by emulsifying in an aqueous solution containing an ion-free emulsifying agent a solution in an alcohol of limited miscibility with water of a formaldehyde condensation product of a substance of amide character capable of forming a hardenable aminoplast with formaldehyde, and which condensation product is etherified with an alcohol of limited miscibility with water, wherein a water-insoluble organic liquid consisting predominantly of an aliphatic hydrocarbon is added and, if desired, the emulsion so obtained is subjected to an evaporation process.

As water-insoluble hardenable carbamide resins there are to be understood condensation products which are obtained from formaldehyde, a substance containing amide groups and capable of forming a hardenable resin with formaldehyde and an alcohol of limited miscibility with water, the three components either being condensed with one another simultaneously or the methylol compound of the substance containing amide groups being reacted with the alcohol to form the corresponding ether. As substances containing amide groups and capable of forming hardenable resins with formaldehyde there come into consideration, more especially, urea, thiourea and aminotriazines containing at least two $NH_2$-groups, such as melamine or benzoguanamine; there are also suitable guanidine, biuret, dicyandiamide and similar compounds.

As alcohols of limited miscibility with water there are to be understood aliphatic, cycloaliphatic or araliphatic alcohols containing more than three carbon atoms, and of which the miscibility with water is not substantially greater than that of n-butanol. There may be mentioned, for example, n-butanol itself, and amyl alcohol, hexyl alcohol, cyclohexanol and benzyl alcohol.

For preparing the emulsions of this invention there are used solutions of a carbamide resin as mentioned above in one or more of the aforesaid alcohols of limited miscibility with water. The concentration of the resin solution to be emulsified is advantageously so chosen that its viscosity permits easy emulsification. The dry content of the resin solution to be emulsified may vary from 40 percent to about 80 percent depending on the viscosity. For example, in the case of a urea-formaldehyde or melamine-formaldehyde condensation product etherified with butanol the dry content is about 70–80 percent, and advantageously about 75 percent.

As emulsifying agents for use in the present process there come into consideration ion-free emulsifying agents which are known or can be made by methods in themselves known, for example, those which are obtained by reacting more than 4 molecular proportions of ethylene oxide with one molecular proportion of a water-insoluble compound containing a hydrocarbon radical of high molecular weight and at least one reactive hydrogen atom. As such compounds there may be mentioned, for example, higher alcohols such as octadecyl alcohol, oleyl alcohol and hydroabietic alcohol; higher fatty acids and derivatives thereof; higher amines, such as oleylamine; and phenols which contain a higher alkyl residue. Suitable emulsifying agents are for instance obtained by using about 20–80 molecular proportions of ethylene oxide in the reaction with a compound of the kind mentioned above. The more active the emulsying agent the smaller the quantiay thereof it is necessary to use, and this leads to an improvement in the adhesive or binding effect to be produced. It may be of advantage to use two or more ion-free emplsifying agents together, for example, a product containing long polyglycol ether chains and a product containing relatively few ethenoxy-units.

As organic liquids, which are of limited miscibility with the carbamide resin solution and are good solvents for the alcohol of limited miscibility with water, there come into consideration benzine-like hydrocarbons consisting preponderantly of aliphatic compounds. When the emulsions produced therewith are to be subjected to concentration by evaporation, it is of advantage to use an organic liquid of which the boiling point is higher than that of the alcohol of limited miscibility with water. Especially suitable are the not too readily volatile types of benzine, for example, extraction benzine boiling at 100–140° C., lacquer and solvent benzine boiling at 140–200° C. or petrol boiling at 150–260° C. In principle any organic liquid can be used which is of unlimited miscibility with the alcohol of limited miscibility with water but not of unlimited miscibility with the carbamide resin used, and of which the boiling point is not substantially below 100° C. and not substantially above 250° C.

In preparing the emulsion it is of advantage first to emulsify the carbamide resin dissolved in the alcohol of limited miscibility with water in the aqueous solution of the ion-free emulsifying agent, while stirring, and then, if desired, after diluting the resulting emulsion with water, emulsifying therein the organic liquid, whereby a 3-phase emulsion is obtained. The carbamide resin solution to be emulsified may first be diluted with the organic liquid to an extent such that the homogeneity of the solution is retained, and then the diluted carbamide resin solution is emulsified in an aqueous solution of the ion-free emulsifying agent. By this procedure a 3-phase emulsion is usually obtained.

Far-reaching stabilization can be produced, according to the invention, by subjecting the 3-phase emulsion to an evaporation process. The evaporation of the emulsion can be carried out in known manner, and the use of reduced pressure is of advantage as in this manner excessively high temperatures, which might have an unfavorable effect on the hardenable resin, are avoided. In order to carry out the evaporation process successfully it is important that intense motion should be imparted to the emulsion which, for example, may be brought about by a powerful stirring mechanism, or preferably by a pump which keeps the mass circulating through a suitable heating and evaporating apparatus, the vapors of solvent and water being withdrawn at suitable places and condensed. A part or the whole of the water and/or organic liquid to be distilled from the emulsion may be replaced during or after distillation by water and/or by another organic liquid. If desired, the quantity of water and/or of the organic liquid to be added may be greater than the quantity distilled off, so that a dilute emulsion is obtained as the final product. In order to obtain a stable emulsion, it suffices for instance to emulsify 3–25 parts by weight or only 6–8 parts by weight or organic liquid calcaulated on 10 parts by weight of carbamide resin solution. Moreover, when preparing the emulsions according to the invention, there may not only be emulsified the quantity of organic liquid required for stabilization, but also so much of organic liquid may additionally be emulsified in the same procedure until the consistency necessary for printing is reached.

Depending on the relative proportions of the constituents or on the extent of the subsequent evaporation, the new emulsions may have a thin consistency such as to be capable of forming drops or a pasty or salve-like consistency. They may be used as such or in admixture with modifying additions, such as water-soluble thickeners, emulsifying thickeners in the form of a benzine emulsion or petroleum emulsion of the oil-in-water type, filling materials, softening agents, pigments for instance in the form of aqueous dispersions, matting agents, etc. for a very wide variety of treatments to improve fibrous materials, especially textiles. The emulsions are also compatible with the addition of larger quantities of strong electrolytes such as salts, acids or reducing agents. After the addition of a hardening or cross-linking agent of any kind, there can be produced by fixation by steaming or heating at temperatures above 100° C. effects, for example, dressings, colorings or prints, which are very fast to washing. In the treatment of fibres which are not resistant to swelling, for example, staple fibers of regenerated cellulose or viscous artificial silk, it is of advantage to add, if necessary, a water-soluble precondensate of formaldehyde with a substance, as mentioned above, which is of amide character and is capable of forming a hardenable aminoplast with formaldehyde. As such water-soluble precondensates there come into consideration, for example, dimethylol-urea, dimethylol-urea dimethyl ether, methylolmelamine or tetramethylol-acetylene-diurea. Especially valuable preparations are obtained by mixing resin emulsions prepared by the present process with natural or synthetic latices, whereby the high resistance to water of the hardened carbamide resins can be coupled with the high binding power and softness of polymer films.

The following examples illustrate the invention, the parts and precentages being by weight:

The dry contents of the solutions of hardenable carbamide resins to be emulsified are determined as follows:

About 2 grams of the carbamide resin solution is maintained in a small flask on a water bath under a pressure of about 20 mm. of mercury, the urea resins being treated for 30 minutes at a water bath temperature of 95° C. and the aminotriazine resins for 1¾ hours on a boiling water bath (98° C.).

*Example 1*

In a solution of 20 parts of a polyethylene glycol ether obtained by the additive combination of 80 mols of ethylene oxide with 1 mol. of oleyl alcohol in 90 parts of water, are emulsified 150 parts of a solution in butyl alcohol of a melamine-formaldehyde condensate etherified with n-butyl alcohol, the solution having a dry content of about 75 percent. The emulsion is then diluted with 140 parts of water. There is obtained a finely dispersed resin emulsion which is stable only for a short time. It is stabilized by emulsifying therein 600 parts of petroleum having a boiling range of 150–260° C.

The thickly salve-like emulsion of the oil-in-water type is very stable and, upon being dried yields a glass-clear water-insoluble film. It contains two different disperse phases, since the melamine-formaldehyde condensate is not miscible with the above quantity of petroleum. The existence of these phases can easily be made visible by agitating the ingredients of the emulsion together, without the emulsifying agent, and then allowing the mixture to stand for a short time. The mixture separates clearly into three layers, of which the upper layer consists mainly of petroleum and butanol, the middle layer of water and the lower layer of melamine resin.

The emulsion which can be diluted with any quantity of water assumes an acid reaction after the addition of an ammonium salt. It can be used, for example, for printing textiles, after the addition, for example, of a softening agent, filling material, pigment dyestuff, matting agent, an agent imparting hydrophobic properties etc. The emulsion also tolerates the addition of dilute acetic acid. After drying the printed textile fabric, the effect produced can be fixed very fast to washing by steaming or hardening at a raised temperature.

*Example 2*

350 parts of a solution in butanol of a melamine-formaldehyde condensate etherified with n-butyl alcohol and only of limited solubility in benzine-hydrocarbons, the dry content of the solution being about 75 percent, are mixed with 350 parts of heavy gasoline having a boiling range of 100–140° C. (extraction benzine). 700 parts of the resulting thinly fluid clear solution are emulsified in an aqueous solution of 35 parts of a polyethylene glycol ether obtained by the additive combination of 35–40 mols of ethylene oxide with 1 mol of octadecyl alcohol in 265 parts of water.

There is obtained a salve-like very finely dispersed emulsion of good stability. As can be demonstrated by agitating a mixture of the components in the same proportions, but without the emulsifying agent, and allowing the mixture to stand, a 3-phase system is also produced in this case.

*Example 3*

350 parts of a solution in butyl alcohol of a urea-formaldehyde condensation product etherified with n-butyl alcohol, the solution having a dry content of about 75 percent, are emulsified in a solution of 30 parts of a condensation product obtained by the additive combination of 35–40 mols of ethylene oxide with 1 mol of octadecyl alcohol in 120 parts of water.

There is obtained a white salve-like finely dispersed emulsion, which remains unchanged only for a few days and soon begins to break up into two layers as the drops of emulsified resin slowly increase in size.

In order to obtain a stable emulsion there are emulsified in the emulsion immediately after its preparation in the manner described above, 350 parts of petroleum having a boiling range of 150–260° C., during which care is taken by the simultaneous addition of 150 parts of water that the relative proportions of the outer phase and inner phases remain unchanged. There are obtained 1000 parts of a white salve-like emulsion of practically unlimited stability.

If the additive combination of 35–40 mols of ethylene oxide with 1 mol of octadecyl alcohol used in this example is replaced by the additive combination of 80 mols of ethylene oxide with 1 mol of p-nonylphenol, there is likewise obtained a very stable emulsion on addition of 350 parts by weight of petroleum and 150 parts by weight of water.

*Example 4*

In 300 parts of an aqueous solution of 20 percent strength of the addition product of 80 mols of ethylene oxide and 1 mol of oleyl alcohol are emulsified 700 parts of a homogeneous solution consisting of 66⅔ percent of a solution in butyl alcohol of a melamine-formaldehyde condensate etherified with n-butanol and of limited solubility in benzine hydrocarbons, the solution having a dry content of about 75 percent, and 33⅓ percent of white spirit having a boiling range of 140–200° C.

There is obtained a white salve-like very finely dispersed emulsion which, like the emulsions of Examples 1 and 2, has an aqueous outer phase and two non-aqueous inner phases. The emulsion is subjected to an evaporation process carried out in such manner that, under a pressure between 400 and 500 mm., there are distilled from 1000 parts of the emulsion 450 parts of a mixture consisting of approximately 25 percent of hydrocarbons, 25 percent of butanol, 48 percent of water and 2 percent of formaldehyde.

During the evaporation there are simultaneously added 250 parts of water, and there in finally obtained as end product 800 parts of a white very stable viscous emulsion, which contains about 45 percent of carbamide resin calculated as dry substance and about 15 percent of hydrocarbons. It can be diluted with water to any desired extent and its stability during storage is practically unlimited.

Especially valuable preparations particularly for textile printing are obtained by incorporating a pigment suspension in the stabilized resin emulsion so obtained, and adjusting it to a viscous consistency suitable for printing, if desired, by the addition of water and emulsification therein of a further quantity of benzine-hydrocarbons. After the evaporation, the resin emulsion can be mixed with rubber latex or synthetic polymer emulsions without impairing its dispersed condition, the quantity of the resin emulsion being advantageously between 25 and 75 percent. By finally adding to the preparation a hardening catalyst, for example, an ammonium salt, there is obtained a printing color which yields on textile fabrics, after hardening or steaming, effects which are very fast to washing and rubbing, and do not substantially stiffen the feel of the fabric.

Example 5

150 parts of the emulsion obtained by evaporation as described in Example 4 are diluted in an emulsifying apparatus with 184 parts of water. After the addition of 50 parts of N:N'-di-methoxymethyl-urea and 16 parts of the addition product of 80 moles of ethylene oxide with 1 mol of hydroabietyl alcohol, there are emulsified in the diluted emulsion 600 parts of petroleum having a boiling range of 150–260° C. There are obtained 1000 parts of a salve-like finely dispersed paste.

The preparation so obtained is suitable as a printing medium for finely dispersed pigment dyestuffs. By also adding thereto a hardening catalyst, for example, ammonium thiocyanate or boric acid, if desired, together with calcium chloride, there is obtained a printing paste which yields on staple fibers of regenerated cellulose and viscous artificial silk, after hardening at 150° C. or after a steaming operation in a neutral or acid medium, effects which are fast to washing and rubbing.

Example 6

In a solution of 40 parts of a polyethylene glycol ether obtained by the additive combination of 25–30 mols of ethylene oxide with 1 mol of hydroabietyl alcohol in 280 parts of water there are emulsified 280 parts of a solution in cyclohexanol of a urea-formaldehyde condensate etherified with cyclohexanol and of only limited solubility in benzine hydrocarbon, the solution having a dry content of about 55 percent.

There is obtained a relatively finely dispersed emulsion, which separates into two layers after standing for a short time. By emulsifying therein 400 parts of petroleum having a boiling range of 150–260° C. a second inner phase is introduced into the emulsion. In this manner there is obtained an excellently dispersed product of good resistance to storage, of which the stability suffices for all practical purposes.

Example 7

In a solution of 35 parts of a condensation product obtained by the additive combination of 80 mols of ethylene oxide with 1 mol of oleyl alcohol and 5 parts of a condensation product obtained by the additive combination of 8 mols of ethylene oxide with 1 mol of commercial oleyl-amine in 310 parts of water there are emulsified 650 parts of a feebly opalescent homogeneous solution, which has been prepared by mixing 200 parts of a solution in butyl alcohol of a benzoguanamine-formaldehyde condensate etherified with n-butanol and of only limited solubility in benzine hydrocarbons, the solution having a dry content of about 70 percent, with 450 parts of petroleum, having a boiling range of 150–260° C.

There is obtained a salve-like finely dispersed emulsion of good stability, which consists of an outer aqueous phase and two inner non-aqueous phases. The emulsion can be diluted to any extent with water without being impaired.

What we claim is:

1. A stable three-phase aqueous emulsion, of which (a) the first internal oily phase consists of a solution, in a substantially water-immiscible alcohol, of a hardenable methylol compound of an aminoplast forming substance selected from the group consisting of urea, thiourea, guanidine, biuret, dicyandiamide and aminotriazines containing at least two primary amino groups, the methylol compound being etherified with a substantially water-immiscible alcohol; of which (b) the second internal oily phase consists of a water-insoluble organic liquid comprising a major proportion of aliphatic hydrocarbons; and of which (c) the external continuous phase is an aqueous medium containing as the only emulsifying agent a non-ionic synthetic emulsifier.

2. A stable three-phase aqueous emulsion, of which (a) the first internal oily phase consists of a solution, in a substantially water-immiscible alcohol, of a hardenable methylol compound of urea, the methylol compound being etherified with a substantially water-immiscible alcohol; of which (b) the second internal oily phase consists of a water-insoluble organic liquid comprising a major proportion of aliphatic hydrocarbons; and of which (c) the external continuous phase is an aqueous medium containing as the only emulsifying agent a non-ionic synthetic emulsifier.

3. A stable three-phase aqueous emulsion as claimed in claim 2, wherein the substantially water-immiscible alcohol is butanol.

4. A stable three-phase aqueous emulsion, of which (a) the first internal oily phase consists of a solution, in a substantially water-immiscible alcohol, of a hardenable methylol compound of urea, the methylol compound being etherified with a substantially water-immiscible alcohol; of which (b) the second internal oily phase consists of a water-insoluble organic liquid comprising a major proportion of aliphatic hydrocarbons; and of which (c) the external continuous phase is an aqueous medium containing as the only emulsifying agent a reaction product of 4–80 molecular proportions of ethylene oxide with one molecular proportion of a water insoluble hydrocarbon substituted by a member selected from the group consisting of hydroxyl, and primary and secondary amino groups.

5. A stable three-phase aqueous emulsion, of which (a) the first internal oily phase consists of a solution, in a substantially water-immiscible alcohol, of a hardenable methylol compound of urea, the methylol compound being etherified with a substantially water-immiscible alcohol; of which (b) the second internal oily phase consists of a water-insoluble organic liquid comprising a major proportion of aliphatic hydrocarbons boiling not substantially below 100° C. and not substantially above 250° C.; and of which (c) the external continuous phase is an aqueous medium containing as the only emulsifying agent a non-ionic synthetic emulsifier.

6. A stable three-phase aqueous emulsion, of which (a) the first internal oily phase consists of a solution, in a substantially water-immiscible alcohol, of a hardenable methylol compound of urea, the methylol compound being etherified with a substantially water-immiscible alcohol; of which (b) the second internal oily phase consists of a water-insoluble organic liquid comprising a major proportion of aliphatic hydrocarbons boiling not substantially below 100° C. and not substantially above 250° C.; and of which (c) the external continuous phase is an aqueous medium containing as the only emulsifying agent a reaction product of 4–80 molecular proportions of ethylene oxide with one molecular proportion of a water-insoluble hydrocarbon substituted by a member selected from the group consisting of hydroxyl, and primary and secondary amino groups.

7. A stable three-phase aqueous emulsion as claimed in claim 6, wherein the substantially water-immiscible alcohol is butanol.

8. A stable three-phase aqueous emulsion, of which (a) the first internal oily phase consists of a solution, in a substantially water-immiscible alcohol, of a hardenable methylol compound of an aminotriazine, the methylol compound being etherified with a substantially water-immiscible alcohol; of which (b) the second internal oily phase consists of a water-insoluble organic liquid comprising a major proportion of aliphatic hydrocarbons; and of which (c) the external continuous phase is an aqueous medium containing as the only emulsifying agent a non-ionic synthetic emulsifier.

9. A stable three-phase aqueous emulsion, of which (a) the first internal oily phase consists of a solution, in a substantially water-immiscible alcohol, of a hardenable methylol compound of melamine, the methylol compound being etherified with a substantially water-immiscible alcohol; of which (b) the second internal phase consists of a water-insoluble organic liquid comprising a major proportion of aliphatic hydrocarbons; and of which (c) the external continuous phase is an aqueous medium containing as the only emulsifying agent a non-ionic synthetic emulsifier.

10. A stable three-phase aqueous emulsion as claimed in claim 9, wherein the substantially water-immiscible alcohol is butanol.

11. A stable three-phase aqueous emulsion, of which (a) the first internal oily phase consists of a solution, in a substantially water-immiscible alcohol, of a hardenable methylol compound of melamine, the methylol compound being etherified with a substantially water-immiscible alcohol; of which (b) the second internal phase consists of a water-insoluble organic liquid comprising a major proportion of aliphatic hydrocarbons; and of which (c) the external continuous phase is an aqueous medium containing as the only emulsifying agent a reaction product of 4-80 molecular proportions of ethylene oxide with one molecular proportion of a water-insoluble hydrocarbon substituted by a member selected from the group consisting of hydroxyl, and primary and secondary amino groups.

12. A stable three-phase aqueous emulsion, of which (a) the first internal oily phase consists of a solution, in a substantially water-immiscible alcohol, of a hardenable methylol compound of melamine, the methylol compound being etherified with a substantially water-immiscible alcohol; of which (b) the second internal phase consists of a water-insoluble organic liquid comprising a major proportion of aliphatic hydrocarbons boiling not substantially below 100° C. and not substantially above 250° C.; and of which (c) the external continuous phase is an aqueous medium containing as the only emulsifying agent a non-ionic synthetic emulsifier.

13. A stable three-phase aqueous emulsion, of which (a) the first internal oily phase consists of a solution, in a substantially water-immiscible alcohol, of a hardenable methylol compound of melamine, the methylol compound being etherified with a substantially water-immiscible alcohol; of which (b) the second internal phase consists of a water-insoluble organic liquid comprising a major proportion of aliphatic hydrocarbons boiling not substantially below 100° C. and not substantially above 250° C.; and of which (c) the external continuous phase is an aqueous medium containing as the only emulsifying agent a reaction product of 4-80 molecular proportions of ethylene oxide with one molecular proportion of a water-insoluble hydrocarbon substituted by a member selected from the group consisting of hydroxyl, and primary and secondary amino groups.

14. A stable three-phase aqueous emulsion as claimed in claim 13, wherein the substantially water-immiscible alcohol is butanol.

15. A stable three-phase aqueous emulsion, of which (a) the first internal oily phase consists of a solution, in a substantially water-immiscible alcohol, of a hardenable methylol compound of benzoguanamine, the methylol compound being etherified with a substantially water-immiscible alcohol; of which (b) the second internal oily phase consists of a water-insoluble organic liquid comprising a major proportion of aliphatic hydrocarbons; and of which (c) the external continuous phase is an aqueous medium containing as the only emulsifying agent a non-ionic synthetic emulsifier.

16. A stable three-phase aqueous emulsion as claimed in claim 15, wherein the substantially water-immiscible alcohol is butanol.

17. A stable three-phase aqueous emulsion, of which (a) the first internal oily phase consists of a solution, in a substantially water-immiscible alcohol, of a hardenable methylol compound of benzoguanamine, the methylol compound being etherified with a substantially water-immiscible alcohol; of which (b) the second internal oily phase consists of a water-insoluble organic liquid comprising a major proportion of aliphatic hydrocarbons; and of which (c) the external continuous phase is an aqueous medium containing as the only emulsifying agent a reaction product of 4-80 molecular proportions of ethylene oxide with one molecular proportion of a water-insoluble hydrocarbon substituted by a member of the group consisting of hydroxyl, primary and secondary amino groups.

18. A stable three-phase aqueous emulsion, of which (a) the first internal oily phase consists of a solution, in a substantially water-immiscible alcohol, of a hardenable methylol compound of benzoguanamine, the methylol compound being etherified with a substantially water-immiscible alcohol; of which (b) the second internal oily phase consists of a water-insoluble organic liquid comprising a major proportion of aliphatic hydrocarbons boiling not substantially below 100° C. and not substantially above 250° C.; and of which (c) the external continuous phase is an aqueous medium containing as the only emulsifying agent a non-ionic synthetic emulsifier.

19. A stable three-phase aqueous emulsion, of which (a) the first internal oily phase consists of a solution, in a substantially water-immiscible alcohol, of a hardenable methylol compound of benzoguanamine, the methylol compound being etherified with a substantially water-immiscible alcohol; of which (b) the second internal oily phase consists of a water-insoluble organic liquid comprising a major proportion of aliphatic hydrocarbons boiling not substantially below 100° C. and not substantially above 250° C.; and of which (c) the external continuous phase is an aqueous medium containing as the only emulsifying agent a reaction product of 4-80 molecular proportions of ethylene oxide with one molecular proportion of a water-insoluble hydrocarbon substituted by a member selected from the group consisting of hydroxyl, primary and secondary amino groups.

20. A stable three-phase aqueous emulsion as claimed in claim 19, wherein the substantially water-immiscible alcohol is butanol.

References Cited in the file of this patent

UNITED STATES PATENTS

| | | |
|---|---|---|
| 2,631,985 | Mullin | Mar. 17, 1953 |
| 2,632,740 | Schibler | Mar. 24, 1953 |
| 2,776,267 | Weber et al. | Jan. 1, 1957 |

UNITED STATES PATENT OFFICE
CERTIFICATE OF CORRECTION

Patent No. 3,006,880                October 31, 1961

Lucius Schibler et al.

It is hereby certified that error appears in the above numbered patent requiring correction and that the said Letters Patent should read as corrected below.

Column 1, line 34, for "multifying" read -- emulsifying --; line 69, for "quanity" read -- quantity --; column 2, line 18, for "adhesives" read -- adhesive --; column 4, line 9, for "emulsying" read -- emulsifying --; line 10, for "quantiay" read -- quantity --; line 13, for "emplsifying" read -- emulsifying --; same column, line 71, for "calcaulated" read -- calculated --.

Signed and sealed this 24th day of July 1962.

(SEAL)
Attest:

ERNEST W. SWIDER
Attesting Officer

DAVID L. LADD
Commissioner of Patents